United States Patent
Li et al.

(10) Patent No.: US 12,491,584 B2
(45) Date of Patent: Dec. 9, 2025

(54) CORROSION-RESISTANT Sn—Ag—Cu SERIES LEAD-FREE SOLDER ALLOY

(71) Applicant: Kunming University of Science and Technology, Yunnan (CN)

(72) Inventors: Caiju Li, Yunnan (CN); Yingde Miao, Yunnan (CN); Zunyan Xu, Yunnan (CN); Li Fu, Yunnan (CN); Liyuan Liu, Yunnan (CN); Jianhong Yi, Yunnan (CN); Qiong Lu, Yunnan (CN); Jiangnan Li, Yunnan (CN)

(73) Assignee: Kunming University of Science and Technology, Kunming (CN)

( * ) Notice: Subject to any disclaimer, the term of this patent is extended or adjusted under 35 U.S.C. 154(b) by 0 days.

(21) Appl. No.: 18/966,034

(22) Filed: Dec. 2, 2024

(65) Prior Publication Data
US 2025/0242447 A1   Jul. 31, 2025

(30) Foreign Application Priority Data

Jan. 26, 2024   (CN) .......................... 202410113524.5

(51) Int. Cl.
*B23K 35/26*   (2006.01)
*C22C 1/02*   (2006.01)
*C22C 13/00*   (2006.01)

(52) U.S. Cl.
CPC .............. *B23K 35/262* (2013.01); *C22C 1/02* (2013.01); *C22C 13/00* (2013.01)

(58) Field of Classification Search
CPC .... B23K 35/262; B23K 35/0222; C22C 1/02; C22C 13/00; C22C 13/02

USPC ......................................................... 420/561
See application file for complete search history.

(56) References Cited

U.S. PATENT DOCUMENTS

2024/0238912 A1*  7/2024  Yokoyama ......... B23K 35/0244

FOREIGN PATENT DOCUMENTS

| CN | 114559179 A | 5/2022 | |
| CN | 115338557 A | 11/2022 | |
| JP | 7323854 B1 * | 8/2023 | ........... B23K 1/0016 |

OTHER PUBLICATIONS

English language machine translation of CN 115338557 A. Generated Feb. 3, 2025. (Year: 2025).*

* cited by examiner

*Primary Examiner* — Danielle M. Carda
(74) *Attorney, Agent, or Firm* — JEEN IP LAW, LLC

(57) ABSTRACT

The present disclosure relates to a corrosion-resistant Sn—Ag—Cu series lead-free solder alloy, belonging to the technical field of soldering material. The present disclosure provides a Sn—Ag—Cu series lead-free solder alloy and a preparation method thereof, wherein the Sn—Ag—Cu series lead-free solder alloy includes, by mass percentage, 2.7-3.3% of Ag, 0.4-0.6% of Cu, 1.5-3.0% of Bi, 0.2-2.0% of Sb, 0.01-0.5% of Zr, and the balance of Sn. The Sn—Ag—Cu series lead-free solder alloy prepared by the preparation method of the present disclosure has properties such as low melting point, high tensile strength, and excellent corrosion resistance. It can be used under harsh conditions and has a wide range of applications.

3 Claims, 7 Drawing Sheets

CORROSION-RESISTANT Sn—Ag—Cu SERIES LEAD-FREE SOLDER ALLOY

CROSS-REFERENCE

This application claims to the benefit of priority from Chinese Application No. 202410113524.5 with a filing date of Jan. 26, 2024. The content of the aforementioned applications, including any intervening amendments thereto, are incorporated herein by reference.

TECHNICAL FIELD

The present disclosure belongs to the technical field of soldering materials and relates to a corrosion-resistant Sn—Ag—Cu series lead-free solder alloy and a preparation method thereof.

BACKGROUND

With the rapid development of modern electronic technology, the trend of miniaturization and diversification of electronic devices is becoming increasingly evident, and the demand for electronic packaging materials is also constantly increasing. Due to the toxicity of lead, the use of traditional Sn—Pb solder has been strictly restricted. Sn—Ag—Cu series lead-free solder has become the best alternative to Sn—Pb solder due to its good wettability and excellent thermal fatigue property. However, Sn—Ag—Cu series lead-free solder as a soldering material still has problems such as high melting point, poor mechanical properties, and poor corrosion resistance, which limits its practical application.

Therefore, it is necessary to provide a corrosion-resistant Sn—Ag—Cu series lead-free solder alloy and a preparation method thereof to obtain Sn—Ag—Cu series lead-free solder alloy with lower melting point, better mechanical properties and higher corrosion resistance.

SUMMARY

In order to overcome the problems in the background, the present disclosure provides a corrosion-resistant Sn—Ag—Cu series lead-free solder alloy and a preparation method thereof. By preparing Sn—Ag—Cu series lead-free solder alloy containing Bi, Sb, Zr, the melting point of the alloy is reduced, the mechanical properties and corrosion resistance of the alloy are improved, providing a high-quality corrosion-resistant solder material for the field of soldering material.

In order to achieve the above objective, the present disclosure is achieved by the following technical solution:

The present disclosure provides a corrosion-resistant Sn—Ag—Cu series lead-free solder alloy, the Sn—Ag—Cu series lead-free solder alloy in percentage by mass includes 2.7-3.3% of Ag, 0.4-0.6% of Cu, 1.5-3.0% of Bi, 0.2-2.0% of Sb, 0.01-0.5% of Zr, and the balance of Sn;

The present disclosure further provides a preparation method of a corrosion-resistant Sn—Ag—Cu series lead-free solder alloy, which includes the following steps:

S1: weighing raw materials of Sn and Zr in percentage by mass, melting the raw materials of Sn and Zr by electric arc furnace under an argon environment, and obtaining a Sn—Zr intermediate alloy after cooling.

S2: weighing raw materials of Ag, Cu, Bi, and Sb in percentage by mass, putting the Sn—Zr intermediate alloy obtained in step 1 and Ag, Cu, Bi, and Sb into a quartz crucible, putting the quartz crucible containing the raw materials into a vacuum induction furnace and melting in argon environment, casting the molten liquid into a graphite mold and cooling to obtain a Sn—Ag—Cu—Bi—Sb—Zr six-element solder.

S3: putting the Sn—Ag—Cu—Bi—Sb—Zr six-element solder prepared in step 2 into a quartz tube and performing vacuum treatment, then putting the quartz tube containing the Sn—Ag—Cu—Bi—Sb—Zr six-element solder into a high-throughput tubular furnace for melting, during the melting process, continuously swing and keeping a temperature, then cooling the quartz tube with the high-throughput tubular furnace to a certain temperature, and taking out the quartz tube containing the Sn—Ag—Cu—Bi—Sb—Zr six-element solder for water cooling to obtain a Sn—Ag—Cu series lead-free solder alloy containing Bi, Sb, and Zr, and ensuring that the final Sn—Ag—Cu series lead-free solder alloy containing Bi, Sb, and Zr has a uniform composition and low oxygen content.

Preferably, in step S1, a purity of Sn and Zr are 99.90%-99.99% and 99.50%-99.90% respectively, a melting temperature is 1300-1500° C., and then a Sn—Zr intermediate alloy button ingot is obtained after cooling for 20-40 minutes.

Preferably, in step 2, a purity of the raw material is 99.90%-99.99%, a melting temperature is 600~650° C., a pouring temperature is 480-520° C., and a molten liquid is cast in a graphite mold to form a bar.

Preferably, in step 3, a melting temperature is 450-500° C., a heat preservation time is 50-80 min, and the quartz tube is cooled with the furnace to 330-370° C. and then taken out for water cooling.

The advantageous effects of the present disclosure are:

According to the present disclosure, by adding Bi, Sb, and Zr to improve the melting point, mechanical properties, and corrosion resistance of Sn—Ag—Cu series lead-free solder, and preparing Sn—Ag—Cu—Bi—Sb—Zr series lead-free solder with lower melting point, higher tensile strength, better corrosion resistance, uniform composition, and low oxygen content through corresponding preparation methods, the application effect of Sn—Ag—Cu series lead-free solder in actual welding can be improved and its application range can be expanded.

DETAILED DESCRIPTION OF THE EMBODIMENTS

Figure 1:
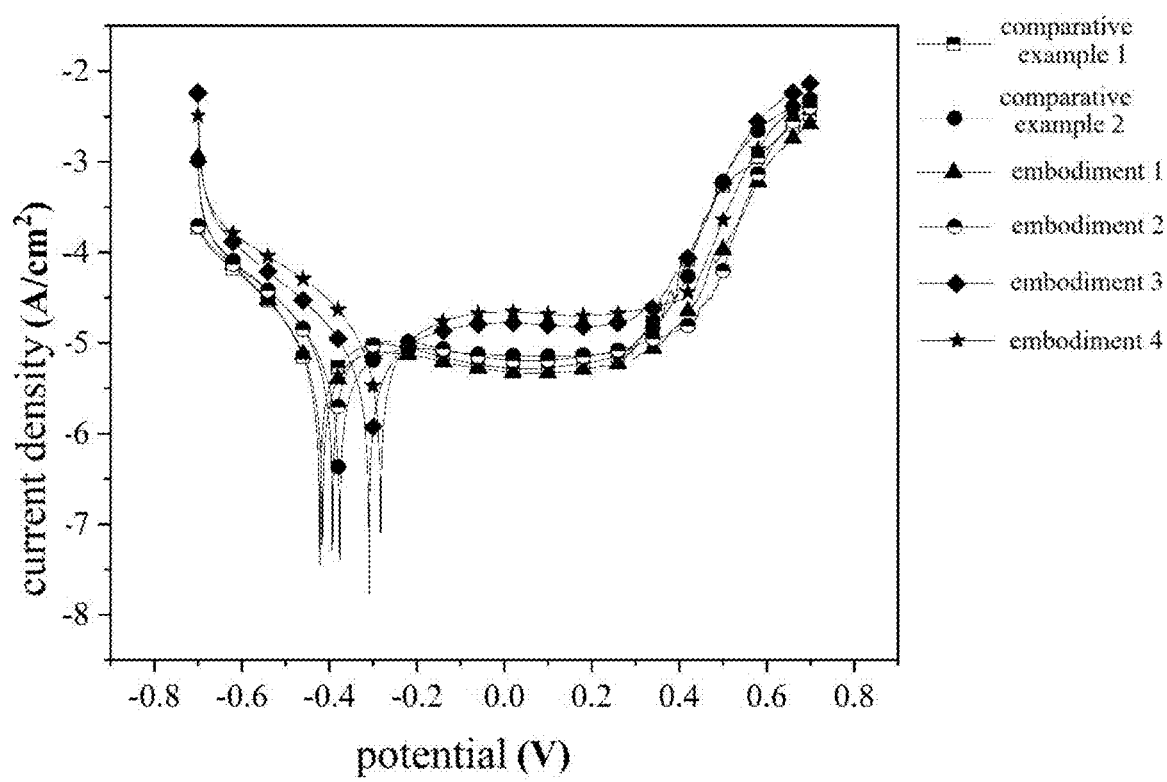
FIG. 1 shows the polarization curve graph of the comparative examples and the embodiments of the present disclosure in a 3.5 vol % NaCl aqueous solution environment.
Figure 2:
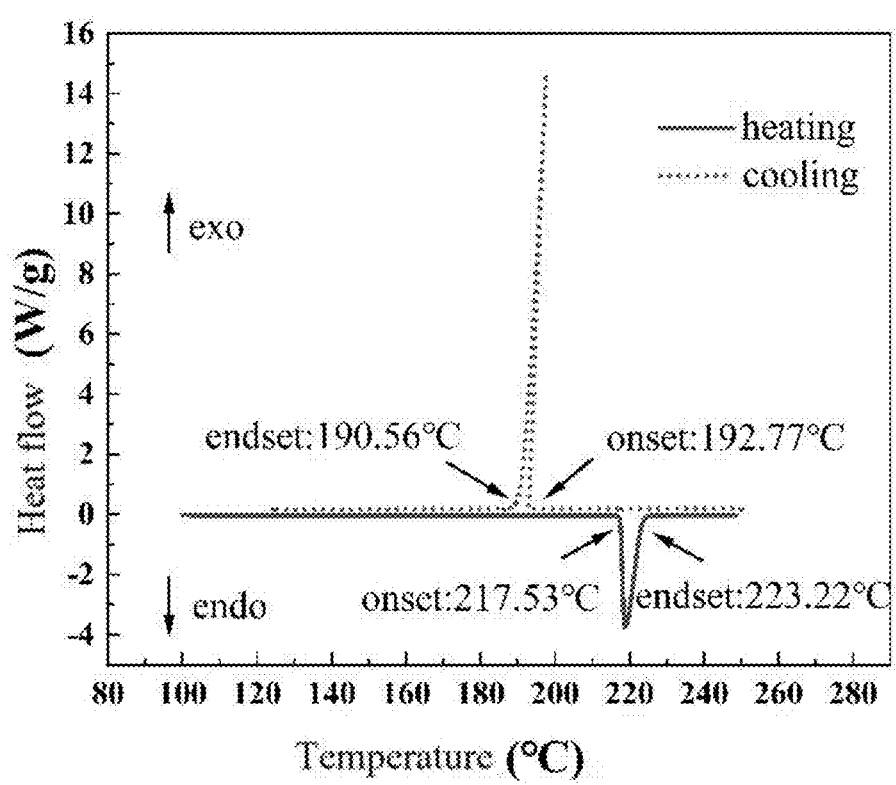
FIG. 2 shows the differential scanning calorimetry curves of the comparative example 1.
Figure 3:
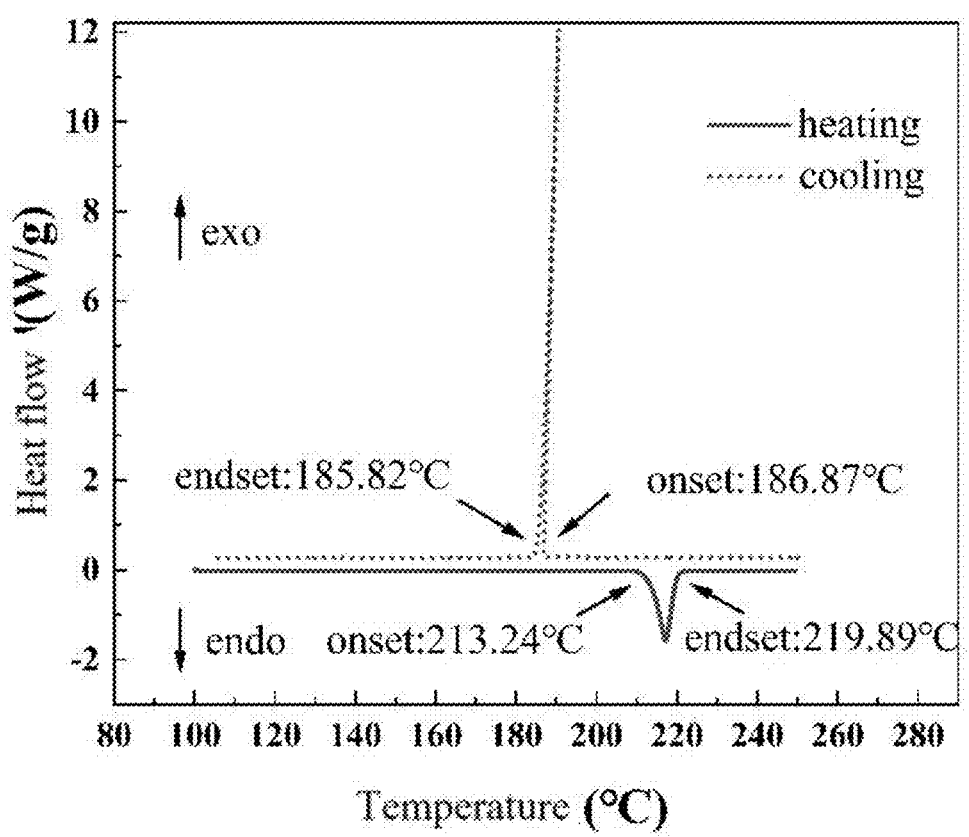
FIG. 3 shows the differential scanning calorimetry curves of the comparative example 2.
Figure 4:
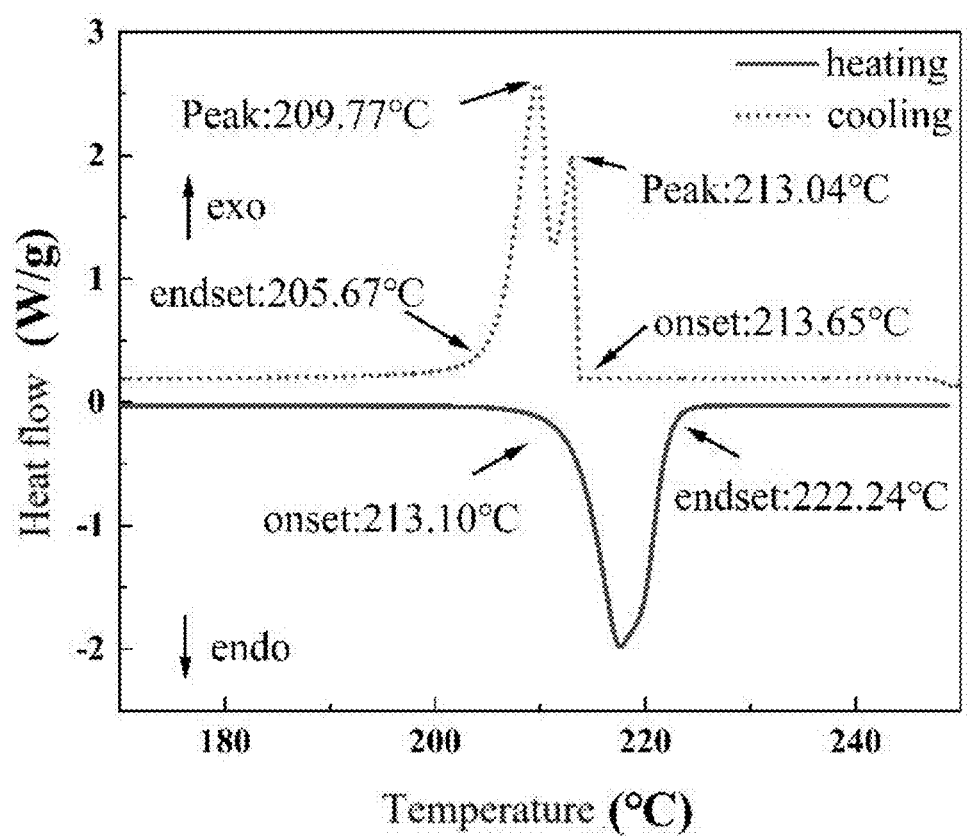
FIG. 4 shows the differential scanning calorimetry curves of the embodiment 3.
Figure 5:
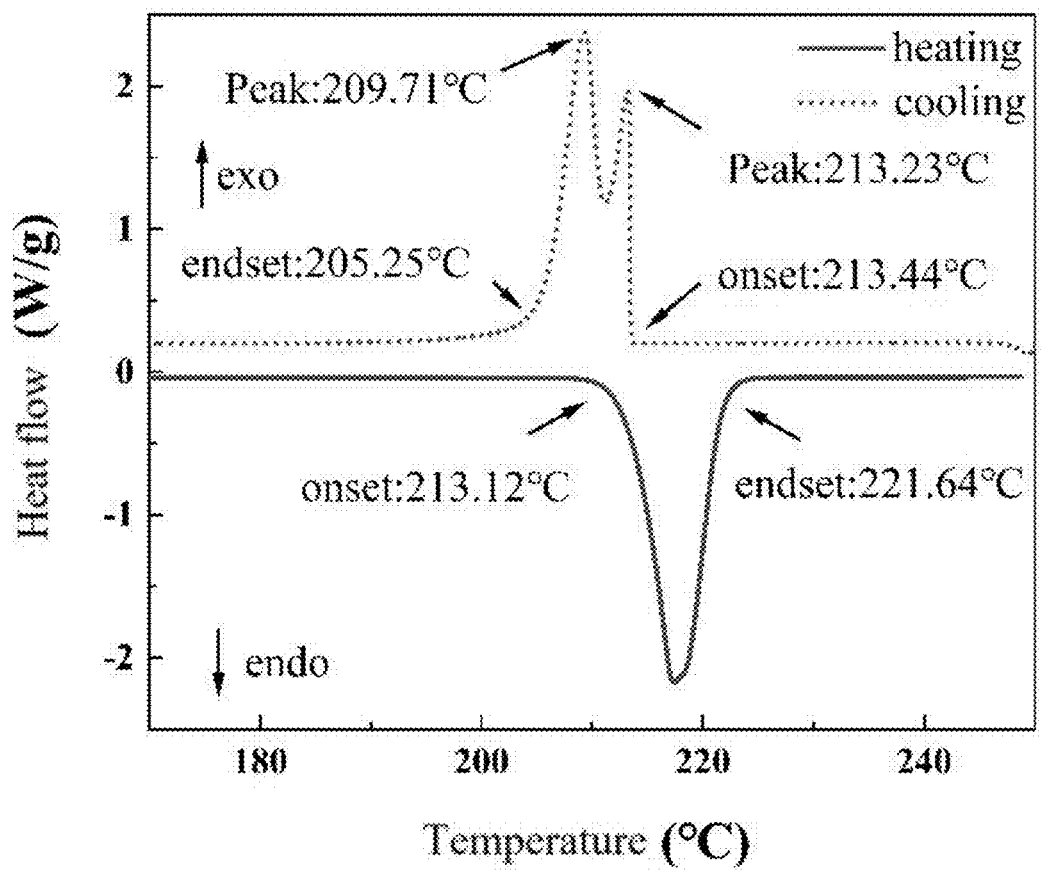
FIG. 5 shows the differential scanning calorimetry curves of the embodiment 4.
Figure 6:
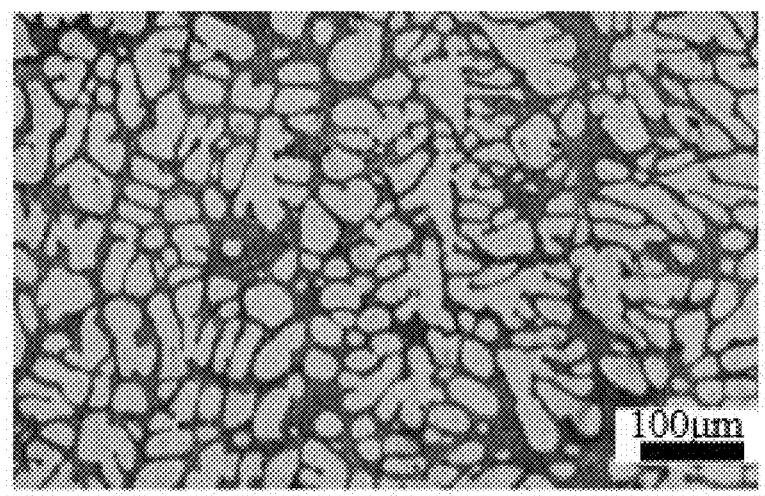
FIG. 6 is the microstructure of the comparative example 1.

The present disclosure will be further described in detail with specific embodiments.

The mass percentages of various compositions of the lead-free solder alloy in the embodiments and comparative examples are shown in Table 1.

TABLE 1

|  | Ag (%) | Cu (%) | Bi (%) | Sb (%) | Zr (%) | Sn |
|---|---|---|---|---|---|---|
| embodiment 1 | 2.7 | 0.4 | 1.5 | 0.2 | 0.01 | the balance of Sn |
| embodiment 2 | 3.0 | 0.6 | 2.0 | 1.5 | 0.1 | |
| embodiment 3 | 3.0 | 0.5 | 2.0 | 0.5 | 0.2 | |
| embodiment 4 | 3.3 | 0.5 | 3.0 | 2.0 | 0.5 | |
| comparative example 1 | 3.0 | 0.5 | — | — | — | |
| comparative example 2 | 3.0 | 0.5 | 2.0 | 0.5 | — | |
| comparative example 3 | 3.0 | 0.5 | — | 0.5 | 0.2 | |
| comparative example 4 | 3.0 | 0.5 | 2.0 | — | 0.2 | |

Embodiment 1

(1) According to Table 1, the raw materials of Sn with a purity of 99.99% and Zr with a purity of 99.9% are weighed and smelted in argon by electric arc furnace at 1400° C. After cooling for 30 min, a button ingot Sn—Zr intermediate alloy with a diameter of 25 mm is formed.

(2) According to Table 1, the raw materials of Ag, Cu, Bi and Sb with the purity of 99.99% are weighed, the Sn—Zr intermediate alloy obtained in Step S1 and the weighed Ag, Cu, Bi, and Sb are put into a quartz crucible. Then, the quartz crucible containing the raw materials is put into a vacuum induction furnace and melted in argon environment at a melting temperature of 600° C. When the molten liquid is cooled to 500° C., it is cast into a graphite mold and cooled to form a bar, so that the Sn—Ag—Cu—Bi—Sb—Zr six-element solder is prepared.

(3) The prepared Sn—Ag—Cu—Bi—Sb—Zr six-element solder is put into a quartz tube and subjected to vacuum treatment, then the quartz tube is put into a high-throughput tubular furnace for melting at a melting temperature of 450° C. During the melting process, the high-throughput tubular furnace is continuously swung and held for 60 minutes before being cooled to 350° C. in the high-throughput tubular furnace and taken out for cooling in water, so as to obtain a Sn—Ag—Cu series lead-free solder alloy containing Bi, Sb, and Zr.

Embodiment 2

(1) According to Table 1, the raw materials of Sn with a purity of 99.90% and Zr with a purity of 99.50% are weighed and smelted in argon by electric arc furnace at a melting temperature of 1300° C. After cooling for 20 minutes, a button ingot Sn—Zr intermediate alloy with a diameter of 25 mm is formed.

(2) According to Table 1, the raw materials of Ag, Cu, Bi and Sb with the purity of 99.90% are weighed, the Sn—Zr intermediate alloy obtained in Step S1 and the weighed Ag, Cu, Bi, and Sb are put into a quartz crucible. Then, the quartz crucible containing the raw materials is put into a vacuum induction furnace and melted in argon environment at a melting temperature of 630° C. When the molten liquid is cooled to 480° C., it is cast into a graphite mold and cooled to form a bar, so that the Sn—Ag—Cu—Bi—Sb—Zr six-element solder is prepared.

(3) The prepared Sn—Ag—Cu—Bi—Sb—Zr six-element solder is put into a quartz tube and subjected to vacuum treatment, then the quartz tube is put into a high-throughput tubular furnace for melting at a melting temperature of 470° C. During the melting process, the high-throughput tubular furnace is continuously swung and held for 50 minutes before being cooled to 330° C. in the high-throughput tubular furnace and taken out for cooling in water, so as to obtain a Sn—Ag—Cu series lead-free solder alloy containing Bi, Sb, and Zr.

Embodiment 3

(1) According to Table 1, the raw materials of Sn with a purity of 99.95% and Zr with a purity of 99.70% are weighed and smelted in argon by electric arc furnace at a melting temperature of 1500° C. After cooling for 40 minutes, a button ingot Sn—Zr intermediate alloy with a diameter of 25 mm is formed.

(2) According to Table 1, the raw materials of Ag, Cu, Bi and Sb with the purity of 99.95% are weighed, the Sn—Zr intermediate alloy obtained in Step S1 and the weighed Ag, Cu, Bi, and Sb are put into a quartz crucible. Then, the quartz crucible containing the raw materials is put into a vacuum induction furnace and melted in argon environment at a melting temperature of 650° C. When the molten liquid is cooled to 520° C., it is cast in a graphite mold and cooled to form a bar, so that the Sn—Ag—Cu—Bi—Sb—Zr six-element solder is prepared.

(3) The prepared Sn—Ag—Cu—Bi—Sb—Zr six-element solder is put into a quartz tube and subjected to vacuum treatment, then the quartz tube is put into a high-throughput tubular furnace for melting at a melting temperature of 500° C. During the melting process, the high-throughput tubular furnace is continuously swung and held for 80 minutes before being cooled to 370° C. in the high-throughput tubular furnace and taken out for cooling in water, so as to obtain a Sn—Ag—Cu series lead-free solder alloy containing Bi, Sb, and Zr.

Embodiment 4

(1) According to Table 1, the raw materials of Sn with a purity of 99.99% and Zr with a purity of 99.90% are weighed and smelted in argon by electric arc furnace at a melting temperature of 1400° C. After cooling, a button ingot Sn—Zr intermediate alloy with a diameter of 25 mm is formed.

(2) According to Table 1, the raw materials of Ag, Cu, Bi and Sb with the purity of 99.99% are weighed, the Sn—Zr intermediate alloy obtained in Step S1 and the weighed Ag, Cu, Bi, and Sb are put into a quartz crucible. Then, the quartz crucible containing the raw materials is put into a vacuum induction furnace and melted in argon environment at a melting temperature of 650° C. When the molten liquid is cooled to 500° C., it is cast in a graphite mold and cooled to form a bar, so that the Sn—Ag—Cu—Bi—Sb—Zr six-element solder is prepared.

(3) The prepared Sn—Ag—Cu—Bi—Sb—Zr six-element solder is put into a quartz tube and subjected to vacuum treatment, then the quartz tube is put into a high-throughput tubular furnace for melting at a melting temperature of 500° C. During the melting process, the high-throughput tubular furnace is continuously swung and held for 60 minutes before being cooled to 350° C. in the high-throughput tubular furnace and taken out for cooling in water, so as to obtain a Sn—Ag—Cu series lead-free solder alloy containing Bi, Sb, and Zr.

Comparative Example 1

The composition of Sn—Ag—Cu series lead-free solder alloy in this comparative example is shown in Table 1. The Sn—Ag—Cu series lead-free solder alloy is prepared according to the preparation method of Embodiment 1.

Comparative Example 2

The composition of Sn—Ag—Cu series lead-free solder alloy in this comparative example is shown in Table 1. The Sn—Ag—Cu series lead-free solder alloy is prepared according to the preparation method of Embodiment 1.

Comparative Example 3

The composition of Sn—Ag—Cu series lead-free solder alloy in this comparative example is shown in Table 1. The Sn—Ag—Cu series lead-free solder alloy is prepared according to the preparation method of Embodiment 1.

Comparative Example 4

The composition of Sn—Ag—Cu series lead-free solder alloy in this comparative example is shown in Table 1. The Sn—Ag—Cu series lead-free solder alloy is prepared according to the preparation method of Embodiment 1.

Under the same experimental conditions, the melting point, tensile strength and corrosion resistance of Sn—Ag—Cu series lead-free solder alloys prepared in embodiments and comparative examples are measured, and the results are shown in Table 2.

TABLE 2

| item | melting point (° C.) | undercooling degree (° C.) | ultimate tensile strength (MPa) | corrosion potential (Vsce) |
| --- | --- | --- | --- | --- |
| embodiment 1 | 213.34 | 0.6 | 68.17 | −0.415 |
| embodiment 2 | 213.46 | 0.13 | 69.98 | −0.394 |
| embodiment 3 | 213.10 | 0.55 | 73.12 | −0.309 |
| embodiment 4 | 213.12 | 0.32 | 71.58 | −0.282 |
| comparative example 1 | 217.80 | 25.03 | 45.87 | −0.422 |
| comparative example 2 | 213.24 | 26.87 | 69.49 | −0.409 |
| comparative example 3 | 218.53 | 3.55 | 56.19 | −0.343 |
| comparative example 4 | 213.36 | 1.97 | 60.04 | −0.364 |

From FIG. 1, it can be seen that the corrosion potentials of the embodiments are higher than that of the comparative examples. As shown in Table 2, the corrosion potential of comparative example 1 is −0.422V, and the corrosion potential of the comparative example 2 reaches −0.409V after adding Bi and Sb, and the corrosion resistance of the Sn—Ag—Cu series solder alloy is slightly improved after adding Bi and Sb elements. However, the corrosion potential of embodiment 4 is −0.282V, which is 33.18% higher than that of comparative example 1 (−0.422V), indicating that the addition of Zr element significantly improves the corrosion resistance of Sn—Ag—Cu series solder alloy. There are two main reasons for adding Zr element to improve the corrosion resistance of the solder alloy: on the one hand, the addition of Zr element can reduce the potential difference between intermetallic compounds and Sn matrix, thereby reducing corrosion sensitivity; on the other hand, the addition of Zr element can increase the content of the oxide film, enhance the stability of the oxide film, improve the stability of the solder alloy, thereby improving the corrosion resistance of the solder alloy.

Figure 7:
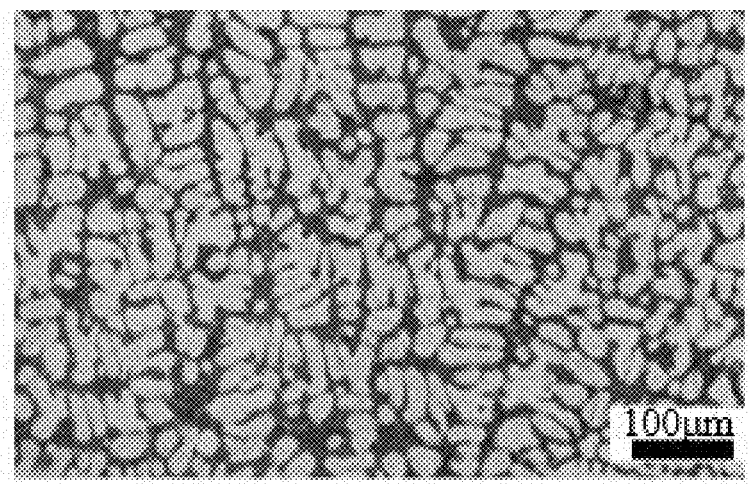
FIG. 7 is the microstructure of the embodiment 3.
Figure 8:
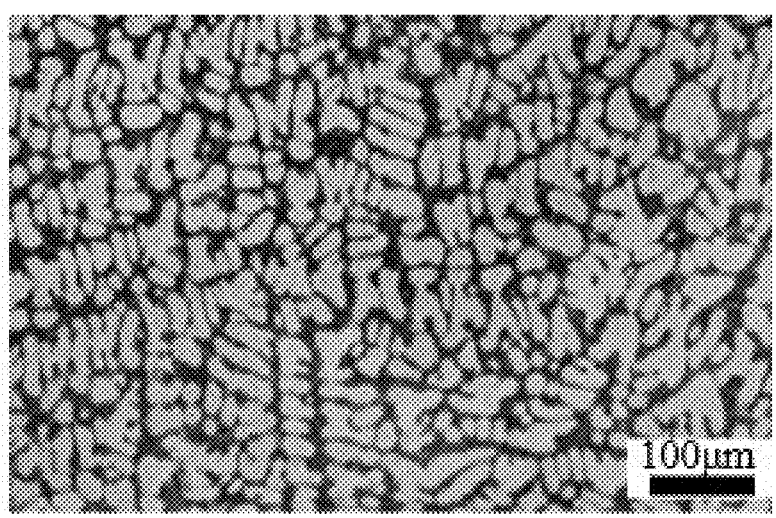
FIG. 8 is the microstructure of the embodiment 4.
Figure 9:
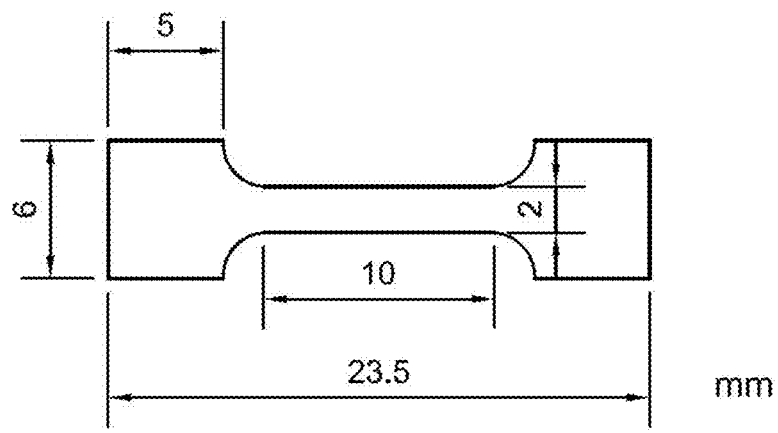
FIG. 9 is a schematic diagram of the tensile specimens used for mechanical properties testing in the comparative examples and the embodiments of the present disclosure.

From Table 2, it can be seen that the melting point of comparative example 3 is the highest, which is 218.53° C., and the melting point of comparative example 2 is reduced by about 5° C. after adding Bi and Sb elements. This is because the atomic radius of Bi is 143 pm, and the atomic radius of Sn is 145 pm, the difference in atomic radius between Bi and Sn is small and they belong to substitutional solid solution. After the addition of Bi element, it is solid solution in the Sn matrix, and the Sn—Bi bond generated by Bi element in the solder alloy has a lower bond energy compared to the Sn—Sn bond, thereby reducing the melting point of the solder alloy. After adding trace amounts of Zr element, the undercooling degree is significantly reduced. This is because the values of undercooling degrees depend on the phase that first nucleates during the solidification process, and the addition of Zr element first forms $ZrSn_2$ intermetallic compounds during the solidification process of the solder alloy, therefore, the undercooling degree is greatly reduced after adding Zr element. Further, $ZrSn_2$ phase can serve as heterogeneous nucleation site refining the microstructure (as shown in FIG. 7, where β-Sn is significantly refined), improving the reliability and corrosion resistance of the solder alloy.

Figure 10:
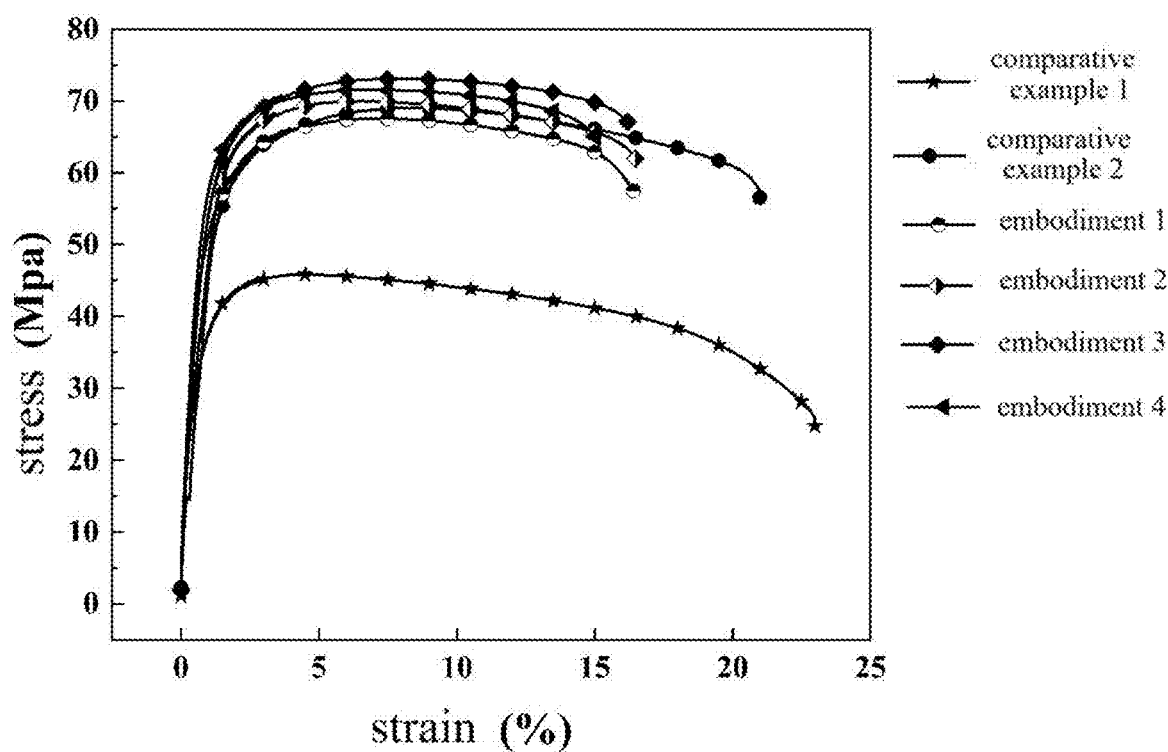
FIG. 10 shows the stress-strain curves of the comparative examples and the embodiments of the present disclosure.

From FIG. 10, it can be seen that the tensile strength of comparative example 2 is significantly better than that of comparative example 1. As shown in Table 2, the tensile strength of comparative example 1 is 45.87 MPa, and the tensile strength of comparative example 2 is 69.49 MPa. After adding Bi and Sb elements, the tensile strength increased by 51.49%, mainly because Bi and Sb elements are solid solution in the matrix, playing a role in solid solution strengthening, and can also serve as heterogeneous nucleation sites to refine grains; the hard particles formed by Bi and Sb elements solid solution in Sn matrix can effectively hinder the dislocation movement, significantly improving the tensile strength of the solder.

The addition of Bi element not only reduces the melting point and enhances the tensile strength, but also improves the wettability of the solder alloy. The addition of Bi element can reduce the surface tension of the solder alloy series, thereby improving the wettability of the solder. At 270° C., the surface tension of Sn is 616 N/m, while the surface tension of Sn—Bi is 425 N/m.

By comparing comparative example 3 with embodiment 3, it can be seen that the melting point of embodiment 3 is significantly lower than that of comparative example 3. As shown in Table 2, the melting point of comparative example 3 is 218.53° C., while the melting point of embodiment 3 is 213.10° C. This is mainly because Bi element is a low melting point alloy element, and the bond energy of the Sn—Bi bond generated is lower.

By comparing example 4 with embodiment 3, it can be seen that the ultimate tensile strength of embodiment 3 is significantly higher than that of comparative example 4. As shown in Table 2, the ultimate tensile strength of comparative example 3 is 60.04 MPa, and the ultimate tensile strength of embodiment 3 is 73.12 MPa. This is mainly because the addition of Sb element has the effect of solid solution strengthening, and Sb as a hard particle can hinder the dislocation movement, improving the ultimate tensile strength of the solder.

By comparing comparative example 2, comparative example 3, and comparative example 4, it can be found that the corrosion potentials of comparative example 3 and comparative example 4 are significantly higher than that of comparative example 2. As shown in Table 2, the corrosion potential of comparative example 2 is −0.409V, the corrosion potential of comparative example 3 is −0.343 V, and the corrosion potential of comparative example 4 is −0.364 V. This is mainly because the addition of Zr element increases the oxide film of the solder; the $ZrSn_2$ phase generated simultaneously can promote the nucleation of Bi and Sb phases, forming fine grains, thereby improving the corrosion resistance of the solder.

At the same time, Bi and Sb elements are solid solution in the Sn matrix to form a substitutional solid solution, creating some vacancies or embedding new particles in the crystal. The addition of Zr element can adjust the crystal defects in the solder alloy, thereby improving the strength of the solder alloy.

By comparison, it can be found that the Sn—Ag—Cu series solder alloy containing Bi, Sb, and Zr prepared by the present disclosure has a lower melting point, better mechanical properties, wettability, and corrosion resistance. Therefore, the Sn—Ag—Cu series solder alloy prepared by the present disclosure containing Bi, Sb, and Zr has a wider applied ranges and can adapt to more harsh environments.

Finally, it should be noted that the above preferred embodiments are only used to illustrate the technical solution of the present disclosure and not to limit it. Although the present disclosure has been described in detail through the above preferred embodiments, those skilled in the art should understand that various changes can be made in form and detail without departing from the scope of the claims of the present disclosure.

What is claimed is:

1. A Sn—Ag—Cu series lead-free solder alloy, consisting of 2.7-3.3% of Ag, 0.4-0.6% of Cu, 1.5-3.0% of Bi, 0.2-2.0% of Sb, 0.01-0.5% of Zr, and the balance of Sn in percentage by mass;
   a preparation method of the Sn—Ag—Cu series lead-free solder alloy comprises following steps:
   S1: weighing raw materials of Sn and Zr in percentage by mass, melting the raw materials of Sn and Zr by electric arc furnace under an argon environment, and obtaining a Sn—Zr intermediate alloy after cooling;
   S2: weighing raw materials of Ag, Cu, Bi, and Sb in percentage by mass, putting the Sn—Zr intermediate alloy obtained in step 1 and Ag, Cu, Bi, and Sb into a quartz crucible, then putting the quartz crucible containing the raw materials into a vacuum induction furnace and melting in the argon environment to obtain a molten liquid, casting the molten liquid into a graphite mold and cooling, after the molten liquid cools down, taking out a Sn—Ag—Cu—Bi—Sb—Zr six-element solder prepared;
   S3: putting the Sn—Ag—Cu—Bi—Sb—Zr six-element solder prepared in step S2 into a quartz tube and performing vacuum treatment, then putting the quartz tube containing the Sn—Ag—Cu—Bi—Sb—Zr six-element solder into a high-throughput tubular furnace for melting at a melting temperature of 450-500° C., during the melting process, continuously swing and keeping a temperature for 50-80 min, then cooling the quartz tube with the high-throughput tubular furnace to 330-370° C., and then taking out the quartz tube containing the Sn—Ag—Cu—Bi—Sb—Zr six-element solder for water cooling to obtain the Sn—Ag—Cu series lead-free solder alloy containing Bi, Sb, and Zr.

2. The corrosion resistant Sn—Ag—Cu series lead-free solder alloy according to claim 1, wherein in step S1, a purity of Sn and Zr are 99.90%-99.99% and 99.50%-99.90% respectively, a melting temperature is 1300-1500° C., and the Sn—Zr intermediate alloy obtained after cooling for 20-40 minutes is a button ingot.

3. The Sn—Ag—Cu series lead-free solder alloy according to claim 1, wherein in step S2, a purity of the raw material is 99.90%-99.99%, a melting temperature is 600-650° C., and the molten liquid is cast in the graphite mold to form a bar when the molten liquid reaches 480-520° C.

* * * * *